United States Patent [19]

Date et al.

[11] 4,306,793
[45] Dec. 22, 1981

[54] CAMERA PROVIDED WITH ELECTROMAGNETIC DRIVE SOURCE

[75] Inventors: Nobuaki Date, Kawasaki; Yoji Sugiura, Yokohama; Ryoichi Suzuki, Kawasaki; Takashi Uchiyama, Yokohama, all of Japan

[73] Assignee: Canon Kabushiki Kaisha, Tokyo, Japan

[21] Appl. No.: 196,359

[22] Filed: Oct. 14, 1980

[30] Foreign Application Priority Data

Oct. 15, 1979 [JP] Japan .................................. 54-132564

[51] Int. Cl.³ ............................................... G03B 9/00
[52] U.S. Cl. .................................. 354/152; 354/228; 354/234
[58] Field of Search ..................................... 354/36–38, 354/152–158, 228–232, 234, 235, 266–271

[56] References Cited

U.S. PATENT DOCUMENTS 4,099,192  7/1978  Aizawa et al. ....................... 354/234

*Primary Examiner*—L. T. Hix
*Assistant Examiner*—William B. Perkey
*Attorney, Agent, or Firm*—Toren, McGeady & Stanger

[57] ABSTRACT

In a camera provided with an electromagnetic drive source when energized producing an electromagnetic force by which the shutter is driven to move, the above-described electromagnetic force of drive source is used only as the power of driving the shutter, while an electromagnetic device which is controlled by a shutter closing signal is provided, so that an initiation of returning movement of the mirror and automatic diaphragm and of lock releasing operation of the film transporting mechanism is controlled by said electromagnetic device.

9 Claims, 3 Drawing Figures

F I G. 1
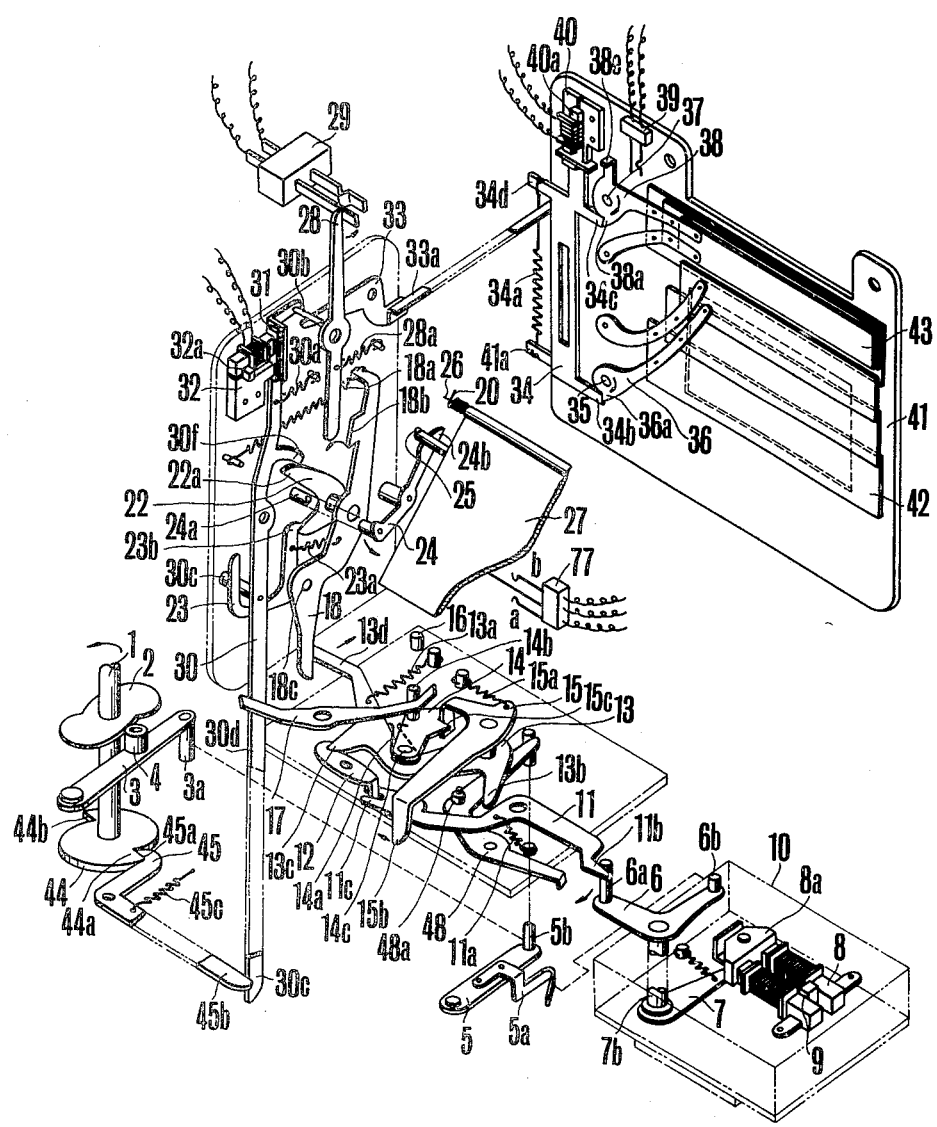

CAMERA PROVIDED WITH ELECTROMAGNETIC DRIVE SOURCE

BACKGROUND OF THE INVENTION

1. Field of the Invention

This invention relates to single lens reflex cameras having electromagnetic drive sources with an electromagnetic force driving directly the focal plane shutter to move.

2. Description of the Prior Art

The conventional cameras have generally made use of a spring or mechanical drive power source in moving the shutter. It is also the common practice in the prior art that such spring power not only is used as the drive force of the shutter, but also is made to serve as a power for initiating a returning movement of the mirror and automatic diaphragm and a releasing of the film transporting mechanism from the locking connection.

Recently a great advance has been achieved in the electronization and compactness of cameras which permits the exposure control and the sequence control operation to be performed electronically. However, even in such highly electronized camera, the drive power source for the shutter is constructed likewise as has been mentioned above, in the mechanical form, thus leading to make the camera structure complicated and to hinder a further minimization of the bulk and size of the camera.

On this account, it is recently proposed to provide for the camera with an electromagnetically driven shutter in which the operation of the shutter is performed directly by the electromagnetic force.

Since this type camera operates under the action of an electromagnetic force of the electronically operated magnetic control device, as that electromagnetic force F may be expressed by $F=BIL$, being proportional to the flux density B, current intensity I and coil length L, in order to drive the shutter to move by an increased driving power, therefore, at least one of the factors B, I and L must be increased. However, the flux density obtained by the magnetic material available at the present time has a limit, and the current intensity available from the battery accommodated in the camera housing has also a limit. Further as for the coil length, upon consideration of its incorporation in the camera, it cannot be made so much long. For these reasons, the electromagnetic force for driving the shutter blades is necessarily limited to a certain lower value than is desired.

Therefore, in the camera provided with the electromagnetically driven shutter, the limitation of the driving power available from the electronically operated magnetic control device to a value not more than to assure the operation of the shutter with sufficient reliability tends to unstabilize the camera operation when the driving power is used up in part to actuate a returning operation of the mirror and automatic diaphragm and to release the film transporting mechanism from the locking connection.

An object of the present invention is to eliminate the above-described drawbacks and to provide a camera with an electromagnetic drive source producing an output power all of which is exclusively used as the driving torque of the shutter, while as the driving force necessary to actuate an initiation of returning movement of the mirror and automatic diaphragm and of releasing of the film transporting mechanism from the locking connection, use is made of an electromagnetic device, whereby the operation of said electromagnetic device is controlled by a deactuating signal for the shutter.

This and other objects of the present invention will become apparent from the following description of an embodiment thereof.

BRIEF DESCRIPTION OF THE DRAWINGS

FIG. 1 is an exploded perspective view of the internal parts of one embodiment of a single lens reflex camera according to the present invention.

DESCRIPTION OF THE PREFERRED EMBODIMENT

Figure 2:
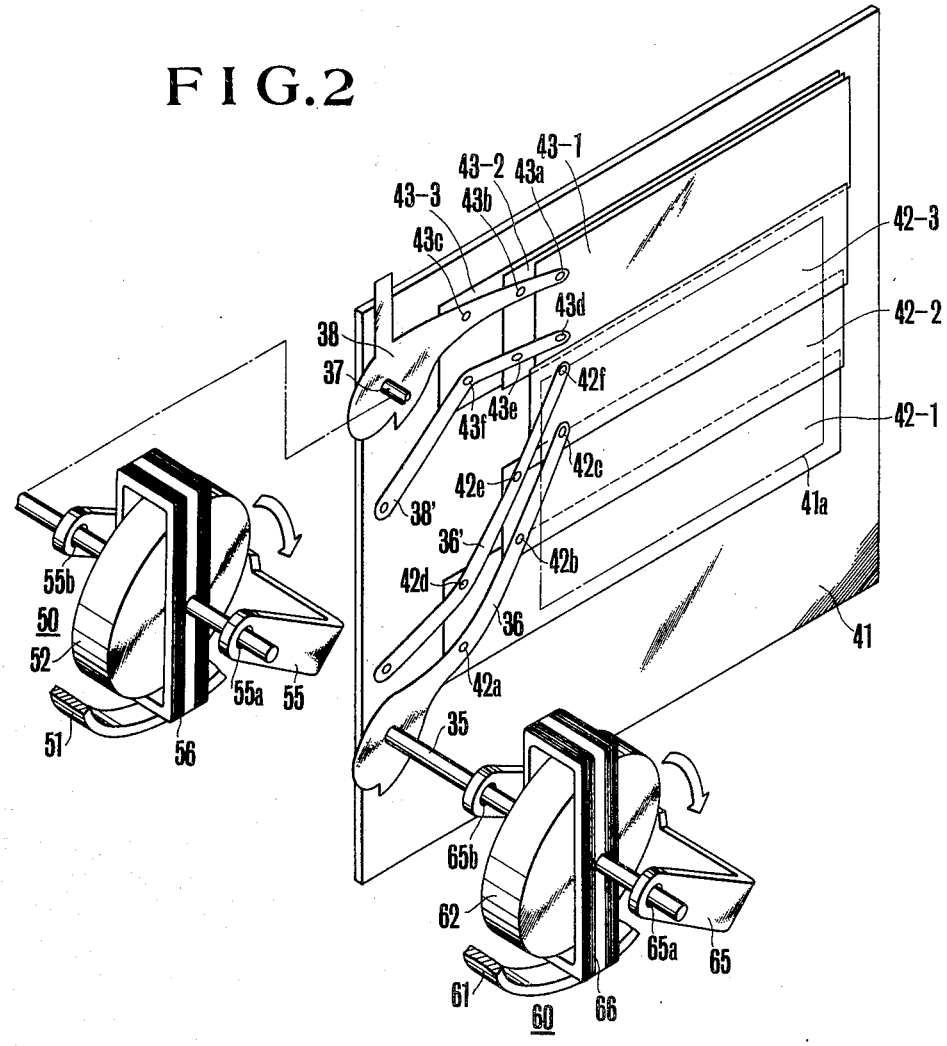
FIG. 2 is an exploded perspective view showing the details of the shutter mechanism of FIG. 1.

The present invention will next be described in connection with one embodiment thereof by reference to the drawings. FIG. 1 shows the interior mechanisms of a single lens reflex camera except an electromagnetic drive source which is omitted for the purpose of clarity. In FIG. 1, 1 is winding shaft driven to rotate when a winding up lever (not shown) is cocked. A cam 2 is fixed to the winding shaft 1. A cam follower 4 is provided on a lever 3 which has a pin 3a planted on the free end thereof and cooperating with a lever 5 through an intermediary (not shown). A leaf spring 5a is fixedly mounted on the lever 5 and engages with a pin 6b planted on a start signal lever 6. Also planted on the lever 6 is a pin 6a engaging with one end 11b of a release lever 11. 8 is an electromagnet provided with a permanent magnet 9 and cooperating with an armature 8a carried on a lever 7. A spring 7a urges the lever 7 to turn in a counterclockwise direction, and is stronger than a spring 11a of the release lever 11 but weaker than the attractive force of the permanent magnet 9. 15 is an automatic diaphragm lever urged by a spring 15a to turn in a counterclockwise direction, and having a downwardly bent-off portion 15c.

The automatic diaphragm lever 15 is pivotally mounted on a common shaft of an automatic diaphragm power lever 13. And the automatic diaphragm power storage lever 13 is urged by a spring 13a to turn in a clockwise direction, and has a pivot pin 14c planted at the center of one arm thereof at which a cooperation lever 14 is movably mounted through a spring 14a. This cooperation lever 14 engages at one end thereof with the downwardly bent-off portion 15c of the automatic diaphragm lever 15, and fixedly carries a pin 14b. The automatic diaphragm power storage lever 13 is further provided with an edged portion 13c for engagement with a latch pawl lever 12 for storing the tension power of the spring 13a. 17 is an automatic diaphragm return signal lever with its one end arranged to engage with the pin 14b of the cooperation lever 14. 16 is a stopper pin for defining the range of rotation of the automatic diaphragm power storage lever 13. 48 is a charge lever for charging the spring 13a of the automatic diaphragm power storage lever 13. A stepped portion 48a of a pin planted in an intermediate portion of the charge lever 48 is to engage with the 13b of the automatic diaphragm power storage lever 13. 18 is a mirror drive lever arranged to engage with the free end 13d of the automatic diaphragm power storage lever 13. An upper bent portion of said lever 18 is urged by a spring 18a to turn in a counterclockwise direction. Pivoted on a common shaft of the mirror drive lever 18 is a mirror flip up lever 22 engaging with a hooked portion 23b of a flip up latch pawl 23 pivoted at a pin 18c which is planted on the mirror drive lever 18. Also the flip up latch pawl 23 is urged by a spring 23a to turn in a clockwise direction. The mirror flip up lever 22 engages with a pin 24a planted on one end of an intermediate lever 24, the opposite end 24b of which engages with a pin 25 planted on a mirror support plate (26 is a rotary shaft of the mirror support plate). Again, the mirror drive lever 18 has a convex portion 18b engageable with an end portion of an actuation lever 28. The actuation lever 28 is urged by a spring 28a to turn in a counterclockwise direction. Again the upper end of the actuation lever 28 is made engageable with a switch 29. 32 is an electromagnet provided with a permanent magnet 32a, said electromagnet 32 attracting an armature 31 mounted on a lever 30 against a spring 30a. Planted at the central portion of the lever 30 is a pin 30c engaging with the flip up latch pawl 23. Again, an intermediate portion 30d of the lever 30 engages with an end portion of the automatic diaphragm return signal lever 17. 33 is a reset lever, one end of said lever 33 having an arm 33a and the other end engaging with a pin 30b on the upper end portion of the lever 30.

34 is a lock member, said lock member 34 having an end portion 34d engageable with the arm 33a of the lever 33. Again, the lock member 34 is urged in a downward direction by a spring 34a tensioned between a projected portion 41a of a shutter base plate 41 and an upper end portion 34d of the lock member 34. 38 is a trailing curtain drive arm having a pawled portion 38a engageable with a projected portion 34c of the lock member 34. 43 is trailing curtain blades defining the opening and closing of a shutter aperture under the action of the arm 38. 37 is a drive shaft of the arm 38. 36 is a leading curtain drive arm, a pawled portion 36a of said arm engaging a projected portion 34b of the lock member 34. 42 is shutter leading blades defining the opening and closing of the shutter aperture under the action of the arm 36. 35 is a drive shaft of the arm 36. 40 is a permanent magnet 40a-appended electromagnet normally holding the lock member in the illustrated position against the action of the spring 34a. 39 is a switch, the opening and closing operation of said switch being controlled by a bent portion 38e provided in the trailing curtain drive arm 38. 77 is a memory switch with a movable contact changing its position from "a" contact to "b" contact when the mirror is moved upwards.

44 is a wind stop pawl, said pawl 44 being mounted on the wind up shaft 1 in coaxial relation thereto and rotating in unison with rotation of the wind up shaft 1. 45 is a stop lever urged by a spring 45c to turn in a counterclockwise direction, a pawled portion 45a of said lever engaging one of the end portions 44a and 44b of the wind stop pawl 44. Again an end portion 45b of said lever engages with a lower end portion 30e of the lever 30.

FIG. 2 shows the details of the main parts of the shutter mechanism of FIG. 1 and electromagnetic drive sources for the shutter mechanism. In FIG. 2, 41 is a shutter base plate having an exposure window 41a. 36, 36' are leading curtain drive arms. The arm 36 is fixedly mounted at one end thereof on the leading curtain drive shaft 35, its drive shaft 35 being rotatably pivoted in the shutter base plate 41. Also the arm 36' is rotatably pivoted at its one end in the shutter base plate 41. Movably mounted on the arms 36 and 36' are thin plate-like leading curtain blades 42-1, 42-2, 42-3 having a light shielding property through pins 42a, 42b, 42c, 42d, 42e and 42f, respectively.

38, 38' are trailing curtain drive arms. 38 is fixedly mounted at one end thereof on the trailing curtain drive shaft 37, its trailing curtain drive shaft 37 being rotatably mounted on the shutter base plate 41. Also the arm 38' is rotatably pivoted at one end thereof on the shutter base plate 41. Movably mounted on the arms 38 and 38' are trailing curtain blades 43-1, 43-2 and 43-3 through pins 43a, 43b, 43c, 43d, 43e and 43f respectively.

65 is a frame of an electromagnetic drive source, said frame being fixedly mounted on the camera housing. 62 is a permanent magnet magnetized in a diametrical direction, said magnet being fixedly mounted. 66 is a shutter curtain drive coil, said coil 66 being fixedly mounted on the leading curtain drive shaft 35. The drive shaft 35 is rotatably supported in support holes 65a and 65b so that the coil 66 is made rotatable relative to a yoke 61 fixedly mounted in spaced relation from the permanent magnet 62.

Thus, the electromagnetic drive source 60 for driving the shutter leading curtain comprises the yoke 61, permanent magnet 62, frame 65 and drive coil 66 and controls the movement of the shutter leading curtain through the drive shaft 35.

Again, the electromagnet drive source 50 for driving the shutter trailing curtain is constructed in a similar fashion to the electromagnetic drive source for the shutter leading curtain from a yoke 51, a permanent magnet 52, a frame 55, and a drive coil 56, and controls the movement of the shutter trailing curtain through the drive shaft 37.

Figure 3:
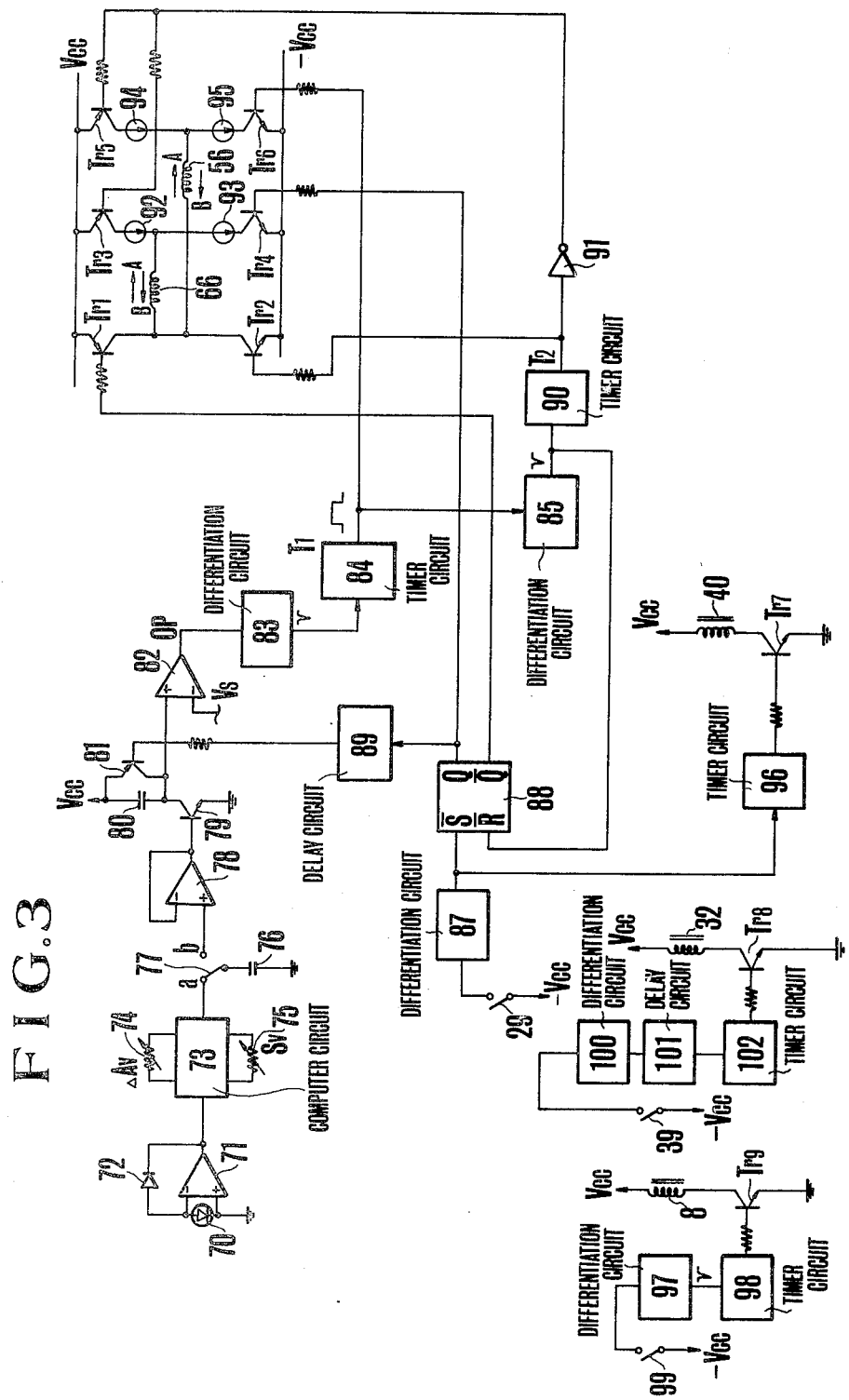
FIG. 3 is a diagram, partly in block form, of the circuitry of the camera of FIGS. 1 and 2.

FIG. 3 is an electrical circuit diagram showing an example of a practical control circuit for controlling the shutter mechanism of FIGS. 1 and 2. In the figure, 70 is a photo-voltaic cell (SPC); 71 is an operational amplifier (hereinafter abbreviated to OP amplifier) constituting an SPC head amplifier between the two inputs of which is connected with the above-described SPC 70, and in the feedback path of which is connected with a diode 72 for logarithmic compression. 73 is a computer circuit known in the art; 74 is a variable resistor for setting a stop down number information ($\Delta Av$) of preset diaphragm; 75 is a variable resistor for setting ASA sensitivity information (Sv) of the used film. The output of the computer circuit 73 represents a shutter time information (Tv) to be controlled. 76 is a condenser for memorizing said Tv information; 77 is a changeover switch normally assuming "a" position and responsive to the start of upward movement of the quick return mirror changing its position to "b" contact; 78 is an OP amplifier constituting a voltage follower; 79 is a transistor for logarithmic elongation with its collector connected to a timing condenser 80; 81 is a switching transistor for count start; 82 is an OP amplifier constituting a comparator circuit with its non-inversion input connected to the collector of the elongation transistor 79 and with its inversion input fed with a reference voltage Vs. 83 is a differentiation circuit connected to the output of the comparator circuit 82; 84 is a timer circuit triggered by a negative differentiation pulse of the differentiation circuit 83 to hold its high level output for a predetermined time interval (for example, 20 ms). 85 is a differentiation circuit connected to the output of the timer circuit 84.

29 is a normally open switch which is closed when the upward movement of the quick return mirror 27 is completed, the closure of said switch resulting in the production of a negative differentiation pulse from a differentiation circuit 87 in the next stage. 88 is an RS flip-flop circuit with its set input connected to the output of the differentiation circuit 87, and with its Q output terminal connected to a delay circuit 89. Again, said delay circuit 89 has an output terminal connected to the base of the count start switching transistor 81 through a resistor. 90 is a timer circuit connected to the output of the differentiation circuit 85 and triggered by a negative differentiation pulse from said differentiation circuit 85 to hold its output of high level for a predetermined time interval (for example, 20 ms). 91 is an inverter connected to the output of the timer circuit 90. Tr1-Tr6 are drive circuits for flowing drive current to the drive coil 66 of the shutter leading curtain electromagnetic drive source 60 and the drive coil 56 of the shutter trailing curtain electromagnetic drive source 50. The transistors Tr1, Tr2, Tr3, Tr4 take a bridge form for the drive coil 66 to control the direction of current flowing through the drive coil. Again, the transistors Tr1, Tr2, Tr5, Tr6 take a bridge form for the drive coil 56 to control the direction of current flowing through the drive coil. Again, connected to the drive circuit are constant current circuits 92-95. 96 is a timer circuit connected to the output terminal of the differentiation circuit 87. By the output of the timer circuit 96, the transistor Tr7 is turned on and maintained in this state for a predetermined time, causing the electromagnet to be energized. 99 is a release switch cooperative with a shutter button (not shown); 97 is a differentiation circuit; 98 is a timer circuit responsive to the output pulse of the differentiation circuit 97 for producing a high level output for a predetermined time; Tr9 is a transistor connected to the output terminal of the timer circuit 98; 8 is an electromagnet for release actuation shown in FIG. 1. 39 is the switch shown in FIG. 1. When this switch 39 is turned on, a differentiation circuit 100 produces an output pulse. 101 is a delay circuit, said delay circuit 101 transmitting the differentiation pulse from the differentiation circuit 100 after having been delayed to a timer circuit 102. The timer circuit 102 responsive to the differentiation pulse from the differentiation circuit 100 through the delay circuit 101 produces a high level output for a predetermined time. Tr8 is a transistor turned on by the output of the timer circuit 97 to energize the electromagnet 32 shown in FIG. 1.

Next explanation is given to the operation of the camera of the invention shown in FIGS. 1, 2 and 3.

Now assuming that as shown in FIG. 1, the shutter charge has been completed. Then, when the release button is depressed, the switch 99 is turned on, causing the differentiation circuit 97 to trigger the timer circuit 98. Then, the output signal from the timer circuit 98 takes high level for the predetermined time during which the transistor Tr9 is rendered conducting to supply current to the magnetic winding 8. Because of this, the permanent magnet 9-appended electromagnet 8 loses the attractive force, permitting the armature 8a to be moved away under the action of the spring 7a. Then, the lever 6 fixed in unison with the lever 7 turns in the counterclockwise direction to bring the pin 6a into engagement with the end portion 11b of the lever 11 and then turn the latter in the clockwise direction against the bias force of the spring 11a. Since the latch pawl lever 12 is turned in the counterclockwise direction as the lever 11 turns, the power storage lever 13 is released from the latching connection to turn in a clockwise direction under the action of the spring 13a, while simultaneously turning the lever 15 with the help of the cooperation lever 14, thereby diaphragm blades (not shown) are closed down to the preset aperture value, as a diaphragm drive ring in the lens mounting (not shown) is turned in a clockwise direction by the downward extension 15b of the lever 15. Such movement of the power storage lever 13 also cause the mirror drive lever to turn in the counterclockwise direction under the action of the spring 18a as it follows up the end portion 13d of the lever 13. Then, the mirror flip up lever 22 turns in the same direction in engagement with the latch pawl 23, thereby the flip up intermediate lever 24 is turned in the counterclockwise direction and the mirror 27 is flipped up by the opposite end 24b through the pin 25 of the mirror support against the bias force of the spring 20. At the start of upward movement of the mirror 27, the switch 77 is moved from the "a" position to "b" position where the shutter time information Tv is stored in the condenser 76.

That is, the circuit of FIG. 3 was rendered operative by the closure of a main switch (not shown) before the release button is depressed, so that the output of the amplifier 71 took a voltage depending upon the object brightness Bv and the full open F value Avo, and said voltage was computed with the aperture stop down information ΔAv and film speed information Sv by the computer circuit 73 to produce an output in the form of the shutter time information Tv. Thus, what enters the condenser 76 is that Tv information, and the foregoing procedure results in the storage of the Tv information on the condenser 76.

When the mirror 27 has turned 45° to reach the terminal end of upward movement thereof, as the mirror drive lever 28 has turned in the clockwise direction against the spring 20, the switch 29 is closed by the convex portion 18b, causing the differentiation circuit 87 to produce an output pulse. This pulse is applied to the timer circuit 96, thereby the timer circuit 96 is triggered to produce an output signal which remains at high level for the predetermined time. Responsive to this signal, the transistor Tr7 is turned on to energize the magnetic winding 40. Then, as the field of the permanent magnet 40a is temporarily cancelled, the lock member 34 is moved downward by the action of the spring 34a, leaving the arms 38 and 36 released at their pawls 38a and 36a from the extensions 34c and 34b of the lock member 34 respectively. Thus, the shutter curtains are rendered operative. It is noted that the shutter curtains are restrained from faulty operation due to their own weights by a suitable means such as weak friction, click or spring known in the art.

The pulse from the differentiation circuit 87 also is applied to the RS flip-flop circuit 88 at its set terminal S, thereby said flip-flop circuit 88 is set to produce a signal of high level at its output terminal Q, and a signal of low level at its output terminal Q. Therefore, the transistors Tr1 and Tr4 are turned on to allow current to flow through the moving coil 66 in the direction indicated by arrow A. Then, a couple of forces is exerted in the part of the coil 66 which lies in the magnetic field, driving the shaft 35 to turn in the clockwise direction. Along with this, the arm 36 also turns in the clockwise direction, moving the leading blades 42-1, 42-2 and 42-3 of the shutter away from the exposure aperture. Thus, an exposure is initiated.

Responsive to the Q output of the flip-flop circuit 88, the delay circuit 89 produces an output signal of high level in the predetermined time which is applied to turn off the transistor 81. Then, a charging of the condenser starts with current from the collector of the transistor 79. Since the base of said transistor 79 is connected to the output of the amplifier 78, the above-described collector current is proportional to the logarithmically elongated value of the Tv information stored on the condenser 76. Therefore, the voltage across the condenser 80 is capable of reaching the reference voltage Vs during a time interval equal to the above-described Tv value. At the termination of duration of this time interval, the comparator circuit 82 is inverted to trigger the differentiation circuit 83. Therefore, the differentiation circuit 83 produces an output pulse which then is applied to trigger the timer circuit 84 with the production of an output signal of high level which continues for the predetermined time interval. This turns on the transistors Tr6, thereby a driving current is allowed to flow through the transistors Tr1 and Tr6 to the moving coil 56 in the direction of arrow A. Thus, the trailing blades 43-1, 43-2 and 43-3 of the shutter are driven to run down by the electromagnetic drive source 50, as the drive shaft 37 turns in the clockwise direction, terminating the exposure. It is noted that the time for which the timer circuit 84 produces the high level output is predetermined to be slightly longer than that necessary to complete the running down movement of the trailing blades of the shutter for the purpose of assuring the closing operation of the shutter with high reliability.

At a time during the closing operation of the shutter, the switch 39 is closed by the end portion 38e of the arm 38, causing the differentiation circuit 100 to produce an output pulse. This pulse after having been delayed by the delay circuit 101 is applied to the timer circuit 102 when the resetting of the leading and trailing blades of the shutter has been completed. As the timer circuit 102 is triggered, the transistor Tr8 is turned on to energize the magnetic winding 32. Since the field of the permanent magnet 32a is cancelled, the lever 30 is permitted to turn in the clockwise direction by the action of the spring 30a. Such movement of the lever 30 causes counterclockwise movement of the lever 33 through the pin 30b. Since at this time the leading and trailing blades of the shutter are reset, the lock member 34 is allowed to move upward against the force of the spring 34a, thus regaining the initial position and being held in this position by the action of the permanent magnet 40a. At the same time, the mirror flip up latch pawl 23 is turned in the clockwise direction by the pin 30c and is released from the lever 22, thereby the mirror 27 is returned to the viewing position under the action of the spring 20.

Such clockwise movement of the lever 30 also causes counterclockwise movement of the signal lever 17 which in turn causes counterclockwise movement of the cooperation lever 14, thereby the lever 15 is released from the connection with the lever 14. Then, the lever 15 is turned in the counterclockwise direction by the spring 15a, thereby the diaphragm mechanism is returned to the initial position where the diaphragm blades are fully opened.

Such movement of the lever 30 furthermore causes clockwise movement of the lever 45 against the force of the spring 45c to disengage the pawled portion 45a from the wind stop pawl 44 at its end portion thereof. Thus, after the trailing blades of the shutter have run down, the winding lever is made operative to turn the shaft.

Further since the downward movement of the mirror is accompanied with the clockwise movement of the lever 24, the lever 22 is turned in the clockwise direction through the pin 24a, while the camming surface 22a lifting upward the projected portion 30f of the lever 30 to bring the armature 31 into contact with the permanent magnet 32a again.

Whilst the returning operation of the various mechanisms is performed by the action of the electromagnetic device 32, after the closing operation of the shutter is terminated by the electromagnetic drive source in response to the high level signal from the timer circuit 84 as has been mentioned above, the timer circuit 84 changes its output to low level at which the resetting operation of the shutter mentioned above is performed. That is, responsive to the low level signal from the timer circuit 84, the differentiation circuit 85 is triggered to produce an output pulse which is applied to reset the flip-flop circuit 88. The pulse from the differentiation circuit 85 also triggers the timer circuit 90. This timer circuit 90 produces a high level signal of predetermined duration and the inverter 91 produces a low level signal. By this, the transistors Tr1, Tr4 and Tr6 are turned off, and the transistors Tr2, Tr3 and Tr5 are turned on, allowing current to flow through the moving coils 66 and 56 in the direction indicated by arrow B. For this reason, the electromagnetic drive sources of FIG. 2 are turned in the reversed direction to that described above, driving the shafts 35 and 37 in the counterclockwise direction, thereby the shutter is reset. Since the duration of output of the timer circuit 90 is predetermined to be slightly longer than the time necessary to reset the leading and trailing blades of the shutter, the resetting operation of the shutter can be performed with high reliability. It is further noted that since the intensity of current of the circuit 92 is predetermined to be larger than that of current of the circuit 94, the resetting movement of the shutter proceeds in a manner such that the trailing blades push the leading ones in order to insure that the film is not accidentally fogged during the resetting operation of the shutter. The termination of resetting movement of the shutter is followed by the change of the output of the timer circuit 90 to low level at which all the transistors in the drive circuit are turned off with an advantage that a wasteful electrical energy consumption is prevented. It is noted that when the shutter is returned to the initial position, the lock member 34 takes the initial position shown in FIG. 1, so that the extensions 34b and 34c engage with the pawls 36a and 38a of the arms 36 and 38, thus locking the shutter mechanism in the reset position.

Next explanation is given to the winding up operation after the completion of the exposure. When a film winding lever (not shown) is cocked, as the lever 45 was disengaged from the pawl disc 44 as has been mentioned above, the shaft 1 is turned in the direction indicated by arrow, and the cam 2 also is turned. By this, the lever 3 is turned in the clockwise direction through the cam follower 4 while driving the lever 5 to turn in the clockwise direction alike. By this, the lever 48 is turned in the clockwise direction through the pin 5b and the stepped portion of the pin 48a turns the lever 13 in the counterclockwise direction against the spring 13a, until it is engaged with the latch pawl 12. Also the leaf spring 5a on the lever 5 is engaged with the pin 6b on the lever 6 and then the lever 6 is turned in the clockwise direction to bring the armature 8a into contact with the electromagnet 8, thus completing one cycle of film winding and charging operation.

It is noted that the synchro switches 46 and 47 connected in series with each other are closed only when the shutter is fully opened and therefore serve as the control switches for the flash device (not shown).

As has been described in greater detail, in a camera having the electromagnetic drive sources according to the present invention, since the returning operation of the mirror, the lock releasing operation of the film transporting mechanism, the returning movement of the lock member of the shutter and the returning movement of the diaphragm are initiated by the force of the electromagnetic device operating independently of the above-described electromagnetic drive sources, the power available from the electromagnetic drive sources can be utilized only in opening and closing the shutter. Therefore, in comparison to the conventional camera in which the shutter and the other mechanisms are operated with the common electromagnetic drive source, the reliability of operation of the shutter can be remarkably improved by the invention.

Since the returning operation of the various mechanism except the shutter is controlled by a newly provided electromagnet, it is made possible to adjust the timing of the start of the returning operation by the electrical signals with ease. Further, since the electromagnet is mechanically independent of the shutter, the degree of freedom in designing the arrangement of the electromagnet is large.

What is claimed is:

1. A camera with an electromagnetically driven shutter, comprising:
    (a) electromagnetic drive sources for opening and closing said shutter by electromagnetic forces, said electromagnetic drive sources being used only as the drive source for the shutter;
    (b) an automatic diaphragm device for performing a closing down operation and its returning operation, said device performing the closing down operation in response to a release actuation;
    (c) control means for performing drive control of said electromagnetic drive sources, said means operating in response to a release actuation;
    (d) signal forming means for producing a signal in response to a closing operation of the shutter; and
    (e) an electromagnetic device of which the operation is controlled by the signal from said signal forming means, said electromagnetic device causing the returning operation of the automatic diaphragm device to be initiated.

2. A camera according to claim 1, further including mirror drive control means for performing drive control of a mirror, said means performing upward movement of the mirror in response to the release actuation and initiating a returning movement of the mirror by the electromagnetic device.

3. A camera according to claim 1, further including lock means for locking the shutter operation, said means being lock-released in response to the release actuation and being brought into locking position by the electromagnetic device.

4. A camera according to claim 1, wherein said signal forming means has a switch, said switch being closed by the closing operation of the shutter.

5. A camera according to claim 1, wherein said electromagnetic device is provided with a permanent magnet.

6. A single lens reflex camera with an electromagnetically driven shutter, comprising:
    (a) a shutter leading member and a shutter trailing member;
    (b) a first electromagnetic drive source for moving said shutter leading member;
    (c) a second electromagnetic drive source for moving said shutter trailing member;
    (d) control means for driving said second electromagnetic drive source in a certain time interval from the driving of the first electromagnetic drive source, said means being actuated in response to a release actuation;
    (e) automatic diaphragm device for performing a closing down operation and its returning operation, said device performing the closing down operation in response to the release actuation;
    (f) mirror drive control means for performing an upward movement and a returning movement of the mirror, said means performing the mirror up operation in response to the release actuation;
    (g) signal forming means for producing a signal in response to an actuation of the shutter trailing member; and
    (h) an electromagnetic device of which the operation is controlled by the signal from said signal forming means, said electromagnetic device initiating a returning operation of the automatic diaphragm device and the mirror drive control means.

7. A single lens reflex camera according to claim 6, further including: lock means for locking the shutter leading member and the shutter trailing member, said means being released from the locking connection in response to the release actuation, and being brought into locking position by the actuation of the electromagnetic device.

8. A single lens reflex camera according to claim 7, wherein said control means has reset means for driving the first and second electromagnetic drive sources to move the shutter leading member and the shutter trailing member in the reversed direction so as to be reset after the first and second electromagnetic drive sources are driven.

9. A single lens reflex camera according to claim 8, further including delay means intervening between said signal forming means and said electromagnetic device, said means controlling the actuation of said electromagnetic device after the resetting operation of the shutter leading and trailing members.

* * * * *